Sept. 30, 1969  M. L. PEARCE  3,470,117
HIGH STRENGTH REFRACTORY BODY

Filed April 19, 1966  2 Sheets-Sheet 1

INVENTOR
MICHAEL L. PEARCE
BY Robert J. Crawford
ATTORNEY

United States Patent Office 3,470,117
Patented Sept. 30, 1969

3,470,117
HIGH STRENGTH REFRACTORY BODY
Michael L. Pearce, Lewiston, N.Y., assignor to Air Reduction Company, Incorporated, New York, N.Y., a corporation of New York
Filed Apr. 19, 1966, Ser. No. 543,606
Int. Cl. C08g *53/08, 53/14;* C04b *21/06*
U.S. Cl. 260—2.5     5 Claims

ABSTRACT OF THE DISCLOSURE

A method for the in situ insulation of a high temperature heat source, according to which a refractory foam, including a heat settable resin and metallic oxides, is applied about the heat source, after which the heat source is brought to temperature so as to carbonize only portions of the refractory shell adjacent said source, resulting in a composite shell body containing high proportions of metal carbides and other carbonized elements adjacent the heat source, but essentially being a green foam at the external surface of the shell.

---

This invention relates to thermal insulating foam materials, and more particularly relates to composite refractory foam materials and methods of making the same.

For many years there has been a need for a low density refractory material with good thermal and acoustical insulating properties. This need, created by the necessity for rugged and efficient thermal insulation in high temperature industry processes, has increased in the past decade because space technology has placed new emphasis on light weight, high strength, heat resistant materials. As a result, considerable research effort, both Government sponsored and private, is currently being devoted to this area.

Numerous recent developments have illustrated the feasibility and practicality of producing low density metal carbide refractory foam materials in much the same manner as prior art plastic type foam materials were created. An April 1960 publication by I. M. Logan et al. entitled Development of Non-Oxidic Refractory Foams, Wright Air Development Division Technical Report No. 60–124, discloses a number of such refractory foam materials which exhibit excellent thermal insulating properties.

The method of preparing the refractory foams generally consists of combining a carbonaceous material such as carbon black and a metal oxide such as titanium dioxide with various resins such as phenol formaldehyde, furfural, epoxide, and isocyanate. At a particular mixture temperature and/or in the presence of an accelerator such as dimethyl sulfate, foaming action occurs to form a green body consisting of the metal oxide, carbon, and the polymerized resin. The green body is placed in an oven and baked to carbonize the resins and then heated at a higher temperature to reduce the metal oxide to form a metal carbide. The composition of the final foam of course depends upon many variables used during the process, such as for example the accelerator concentration, the starting temperature, the total starting material mass, heat capacity, contour geometry, environmental temperature, firing temperature, and various combinations of these variables.

The baking and firing of the refractory foams result in linear shrinkage of the green body which may be as much as 40%, which creates extreme cracking difficulties. See, for example, the aforementioned I. M. Logan publication. Consequently, many process variables must be very carefully controlled to reduce the cracking problems as far as possible. Some such controls are set forth in the Logan publication but, insofar as is known, complete elimination of the cracking difficulties has not been effected.

The prior art heat treated refractory foams, in addition to being subject to shinkage and resulting cracking, are relatively soft, being subject to crumbling, and cannot withstand high pressure and normal wear and tear. These refractory foams, due to their lack of durability, are generally unsuitable for industrial use.

At the same time, however, the green body before it has been baked and fired, is a relatively rigid and strong material. The subject matter of this invention resides in combining in a single composite body the relatively high strength green body and the fired low density metal carbide refractory foam.

I have found that by producing a green body of foam material and applying heat to only one side thereof, the inside portion of the material takes on the characteristics of a fired foam and consists primarily of a metal carbide, whereas the central part of the foam material consists of the carbonized foam which contains primarily carbon, metal oxide, and some small percentage of metal carbide. The area of the foam most removed from the heat source remains a green body and primarily consists of carbon, polymerized resin, and metal oxide. This composite material, when placed around an object to be insulated, has all the advantages of a good thermal insulator produced by the refractory metal carbide foam material and at the same time exhibits externally the rugged physical properties of the green body. Moreover, the impervious nature of the green body affords protection of the inner refractory material from oxidizing gases.

The composite material has many additional advantages. For example, an existing industrial heat producing apparatus such as a furnace or pipe may be insulated by an in situ formation of a green body enclosing the apparatus. The heat producing apparatus may then be raised to operating temperature in a controlled manner wherein the thermal composite insulation material is produced in situ by the generation of heat in the apparatus to be insulated.

It is therefore an object of this invention to provide a composite low density refractory foam material which exhibits both good thermal insulation and high strength properties.

A further object of the invention is to provide a process for insulating heat generating apparatus by the in situ formation of a low density refractory foam layer around the apparatus.

These and other objects of the invention will be readily apparent as the description proceeds with reference to the annexed drawings in which.

In producing a metal carbide refractory foam material, it is typical in the prior art to foam the starting materials in containers such as paper cups by conventional plastic foam techniques. In one reported instance, the foams are baked in a laboratory oven at temperatures such as 25° F./hr. to 325° F. and held there for a substantial length of time such as 12 hr., at which time the foam becomes hard and firm. These heat treated foams are then transferred to retorts for carbonizing. These retorts are boxes of silicon carbide tile which are provided with removable lids and with a liner of thin graphite slabs. The boxes are provided with a tube through which nitrogen gas is led to maintain an inert atmosphere in the box. Temperatures are raised on a schedule to 1000° C. and held for 2 hr., at which time the power is cut off and the boxes cooled to 200° C. with the nitrogen continuing throughout the cycle. The carbonized samples are then given a continuing burn at temperatures of up to 2400° C. The fired foams are hard, porous masses with a crisp, firm texture and generally consist of a metal carbide, depending upon the starting materials and process parameters.

One prior art foam formulation used for making a titanium carbide refractory foam by the process outlined above is as follows:

| | |
|---|---|
| Phenol formaldehyde resin, g. | 39.0 |
| Epoxide resin, g. | 18.0 |
| Dimethylformamide, cc. | 10.0 |
| Acetone, cc. | 10.0 |
| Lamp black carbon, g. | 1.7 |
| Titanium dioxide powder, g. | 45.0 |
| Isocyanate resin, g. | 18.0 |

As previously pointed out, such foams, while having good thermal insulation properties, are relatively weak physically, being subject to chipping, cracking, scratching, marring, etc., and are therefore unable to withstand the treatment normally encountered in heavy industrial areas. It is therefore apparent that some means are necessary to protect the material from the environmental surroundings.

Figure 1:
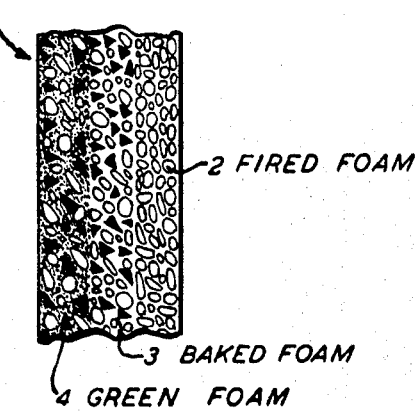
FIG. 1 is a cross section of the composite material of this invention.

FIGURE 1 of the drawing illustrates the composite material of this invention which exhibits high strength, good thermal insulation and, when used to enclose, is not susceptible to external oxidation. The composite foam is illustrated in cross section generally at 1 and comprises an inner portion 2 which consists primarily of a metal carbide such as titanium carbide, a central portion 3 which consists primarily of carbon with minor amounts of metal oxide and metal carbide, and an outer portion 4 which is essentially a green foam and contains polymerized resin, carbon, and metal oxide. It will become apparent as the description proceeds that the composition of the foam material 1 does not abruptly change between the interior side 2 and exterior side 4, but that there is a gradual decrease in the ratio of metal carbide to polymerized resin, metal oxide, and carbon in progressing from the interior side 2 toward the exterior side 4.

The manner in which the composite material of FIGURE 1 is made is to first create a green foam by combining the starting materials of organic resin, carbon, and metal oxide in a manner well known in the prior art. At this point heat is applied only to the inner side of the foam material. The obvious result is that as the temperature on the inner side is raised to values such as 2000° C., the inner portion 2 undergoes the reactions of carbonizing the organic resins and reducing the metal oxide to form metal carbide. If there is an imbalance of carbon with respect to the amount of metal present in the foam, the inner portion 2 will consist of titanium carbide plus the excess of carbon, or in the alternative, should there be a chemical imbalance with an excess of metal oxide with respect to carbon, the inner portion will consist of metal carbide and metal oxide. Since the interior portion 2 is a good thermal insulator, the heat reaching the central portion 3 is substantially reduced, but will be sufficient to carbonize the resin and perhaps reduce some small portion of the metal oxide which will react with carbon to form some small amount of metal carbide. It is apparent, however, that there will be a central portion which is primarily carbon and metal oxide. An outer portion 4 will remain where the temperature is too low to carbonize the resin so that the green body will remain in its as-foamed condition and consist of polymerized resins, carbon, and metal oxide.

Although FIGURE 1 illustrates the material as being divided into three distinct parts for convenience, it is obvious that the chemical reaction will be greatest near the source of heat and produce the greatest amount of metal carbide with a gradual decrease in metal carbide and increase in carbon and polymerized resin as the material progresses in a direction away from the heat until a point is reached where the starting materials are predominant.

The advantages of the composite foamed material of FIGURE 1 over the prior art are many. The interior portion which consists primarily of metal carbide is extremely refractory and is a good thermal insulator as illustrated in the prior art. In the case of titanium carbide, for example, the foam will withstand temperatures to approximately 3100° C. in non-oxidizing gas atmospheres. At the same time, the disadvantages of the relatively weak, oxidizable nature of the titanium carbide is overcome because this material is protected by the strong impervious section 3.

Figure 2:
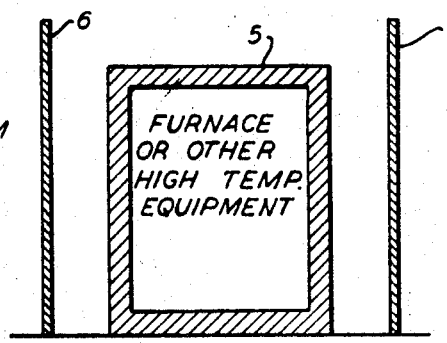
FIG. 2 illustrates a simplified cross sectional view of an uninsulated industrial furnace with a partition constructed therearound.
Figure 3:
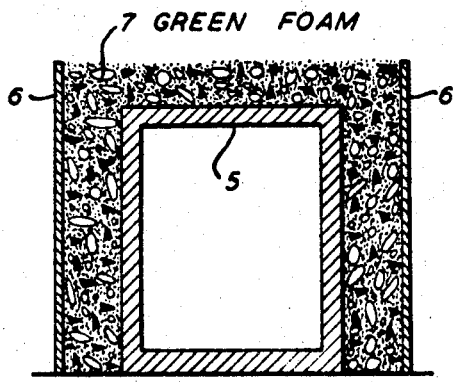
FIG. 3 is a cross sectional view of the furnace of FIG. 2 containing the as-foamed green body.
Figure 4:
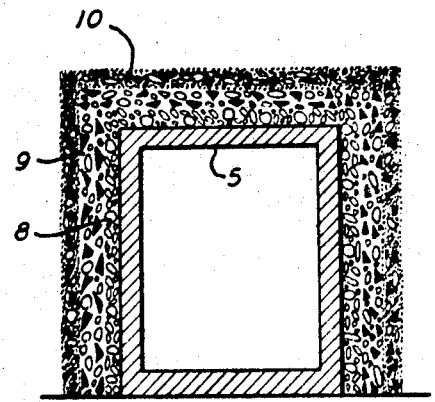
FIG. 4 is a schematic representation of the furnace and foam material of FIG. 3 illustrating the approximate composition of the composite foam after the furnace has been brought to operating temperatures and the partition has been removed.

In the in situ formation of the foam, the problem of cracking created by the high shrinkage rate of the final foam is eliminated. Since the outer portion of the foam is not fired, there is little or no shrinkage and the composite material presents a rigid, impermeable surface to the external environment. Consequently, this invention is concerned with facilitating the insulation of heat producing apparatus in an in situ operation. FIGURE 2 is a plan view partially in section of a non-insulated furnace 5 having a partition 6 enclosing the sides thereof for in situ formation of the foam. Note that the upper portion of the partition 6 extends slightly above the top of the furnace 5. FIGURE 3 shows a foam 7 which has been formed in situ between the furnace walls and the partition. FIGURE 4 shows the insulated furnace and schematically illustrates the three separate areas of the composite material 7 after the furnace has been brought up to operating temperature. The three theoretical layers are illustrated at 8, 9, and 10. The portion 8, having been exposed to the highest temperatures, is composed primarily of metal carbide, whereas the center portion consists primarily of carbon and metal oxide, and the outer portion 10 remains as the original green foam.

As a specific example of the in situ formation of a foam material around high temperature equipment, a small glow bar furnace was constructed using glow bars, fire bricks, and alundum cement. A partition was built about the furnace using cardboard, tape, and wire, such that a 2 in. cavity remained between the partition and the furnace. Starting materials formed by mixing 2250 cc. furfurol resin, 3600 g. titanium oxide, 180 g. lamp black, and 125 g. Durez No. 17912 accelerator, were mixed in a 1 gal. container. The Durez accelerator is commercially available from Varcum Chemical Company, Niagara Falls, N.Y. Other foaming agents such as dimethyl sulfate are equally satisfactory as catalyst. Several containers of the mixture were made. The mixtures were heated to a temperature of about 70° C., at which time the rate at which the temperature of the mixture was increasing (due to the exothermal polymerization reaction) indicated that it was about to foam. The mixture was then poured into the cavity, whereupon the foaming action occurred after a short delay. This operation was repeated eight times in order to completely fill the cavity and cover the top of the furnace to a depth of approximately 2 in. The foam was allowed 24 hr. to cure and then the temperature of the furnace was raised very slowly until it reached temperatures in excess of 1000° C. The exterior of the surface remained hard and relatively cool and exhibited the physical properties of the green body.

Figure 5:
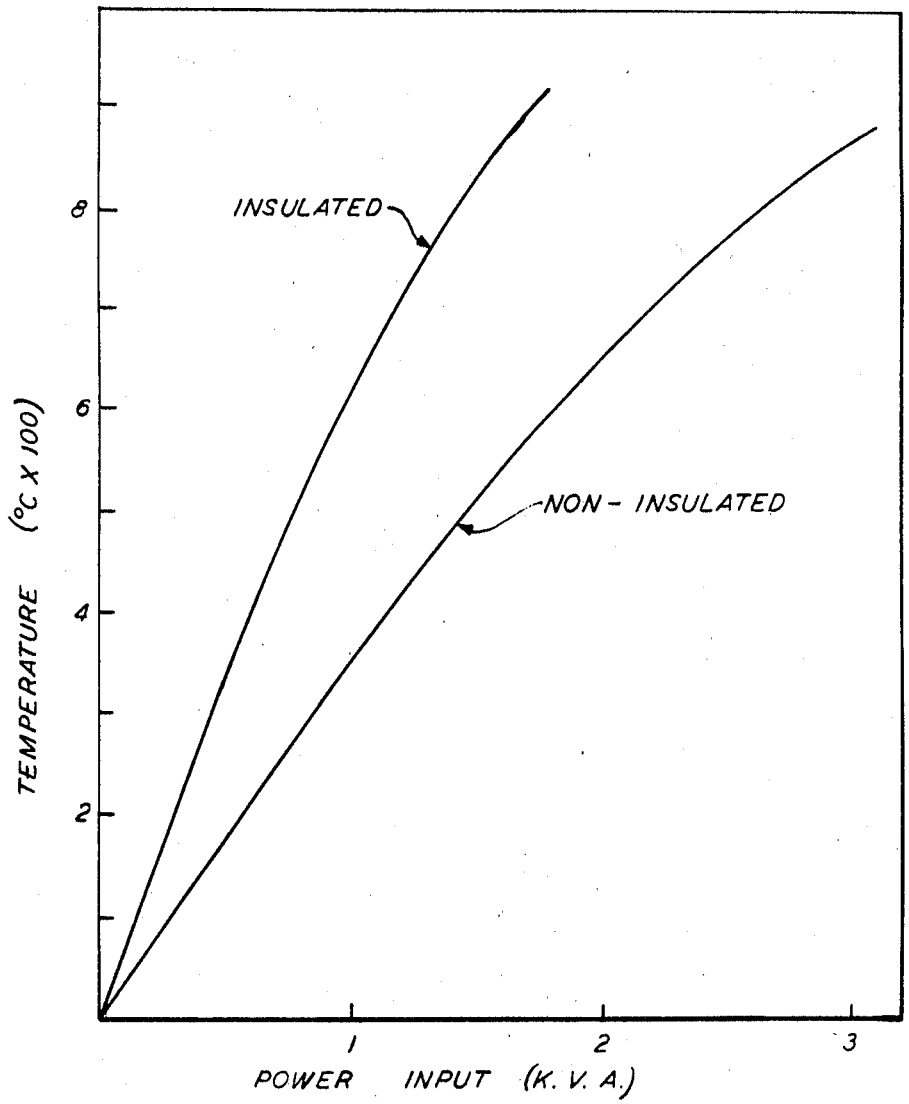
FIG. 5 is a graph illustrating the power savings in a furnace insulated in situ by the composite foam material of this invention.

FIGURE 5 of the drawing compares the temperature-power relationships for the uninsulated furnace and for the in situ insulated furnace described above. It is apparent that a power saving of approximately 50% was achieved by the insulation.

Although the above example and general discussion has concentrated around the insulation of a furnace, it is obvious that any high temperature equipment may be insulated by in situ operation as described with respect to the furnace.

It is also apparent that the proportion of metal carbide formed in the inner portion of the foam material will depend primarily upon the maximum temperature at which the high temperature equipment is operated.

Generally the higher the temperature the more complete the reduction of the metal oxide and formation of metal carbide.

The starting composition will also affect the amount of metal carbide which can be formed within the inner portion of the foam. For example, if the starting composition is such that the ratio of carbon to titanium oxide is equal to 0.05, the ratio of resin to titanium is equal to 0.625 and the foaming agent to resin ratio is equal to 0.07 to 0.12. The resulting fired foam is essentially pure titanium carbide. As previously pointed out, however, compositions similar to that given above are given in the prior art. The particular batch composition may be varied to provide excess of carbon or metal in the interior layer as may be desired.

The specific example illustrated above is directed to the formation of titanium carbide foams. It should be noted, however, that similar refractory carbide forms with good insulation properties may be prepared using the oxides of zirconium, hafnium, niobium, tantalum, and tungsten in place of titanium oxide.

Obviously many modifications and variations of the invention are possible in the light of the above teachings. It is therefore to be understood that within the scope of the appended claims the invention may be practiced otherwise than as specifically disclosed.

I claim:

1. A light porous, impact resistant, refractory body in the form of a shell consisting essentially of a metal carbide, carbon, metal oxide, and thermoset organic resin, the metal of both said carbide and said oxide being the same and selected from the hard metal group of titanium, zirconium, hafnium, niobium, tantalum, and tungsten, the ratio of said metal carbide to the carbon, metal oxide, and resin gradually decreasing from a point on the interior surface of said shell toward the outer surface of said shell.

2. A refractory body as in claim 1 wherein the innermost portion of said shell consists essentially of said metal carbide and the outermost portion of said shell consists essentially of said resin, metal oxide, and carbon.

3. A refractory body as in claim 2 wherein said resin is furfurol resin and said metal is titanium.

4. A method of making a light, porous, high strength, refractory shell comprising the steps of combining starting materials of a thermo-settable organic resin, carbon, a foaming agent, and a metal oxide taken from the group of the oxides of titanium, zirconium, hafnium, niobium, tantalum, and tungsten, gently heating said starting materials to create an exothermic polymerization reaction and form a foam; forming said foam into said shell; and applying heat to the interior surface only of said shell so as to carbonize the adjacent portion of said shell without substantially carbonizing volumes of said shell adjacent the outside surface thereof whereby a refractory body results consisting of said metal oxide, the carbide of the metal of said metal oxide, the thermoset form of said organic resin, and carbon, the ratio of said metal carbide to the carbon, metal oxide, and resin gradually decreasing from a point on the heated interior surface of said shell toward the exterior surface of said shell.

5. A method for the in situ insulation of high temperature equipment with a refractory shell comprising the steps of constructing a partition around and spaced from said equipment; combining starting materials consisting essentially of an organic thermo-settable resin, carbon, a foaming agent and a metal oxide taken from the group of the oxides of titanium, zirconium, hafnium, niobium, tantalum, and tungsten; pouring said starting materials into said partition; producing an exothermic polymerization reaction of said resin to form a foam body; repeating the foregoing steps until said equipment is surrounded by said foam; and bringing said high temperature equipment up to operating temperature so as to carbonize portions of said shell adjacent said equipment without substantially carbonizing volumes of said shell adjacent the outside surface thereof, thereby rendering said shell a composite material consisting of said metal oxide, the carbide of said metal, the thermoset form of said organic resin, and carbon, the ratio of said metal carbide to the carbon, metal oxide, and resin gradually decreasing from a point on the heated internal surface of said shell toward the surface of said shell removed from said heated surface.

References Cited

UNITED STATES PATENTS

| | | |
|---|---|---|
| 3,124,542 | 3/1964 | Kohn et al. |
| 3,153,636 | 10/1964 | Shanta et al. _____ 106—40 |
| 3,175,918 | 3/1965 | McGahan et al. |

MURRAY TILLMAN, Primary Examiner

W. J. BRIGGS, SR., Assistant Examiner

U.S. Cl. X.R.

106—40, 41, 55, 57; 264—29, 44, 54